March 4, 1941.  E. KORTEN ET AL  2,233,817
PROCESS FOR PRODUCING MELAMINE
Filed Jan. 30, 1939
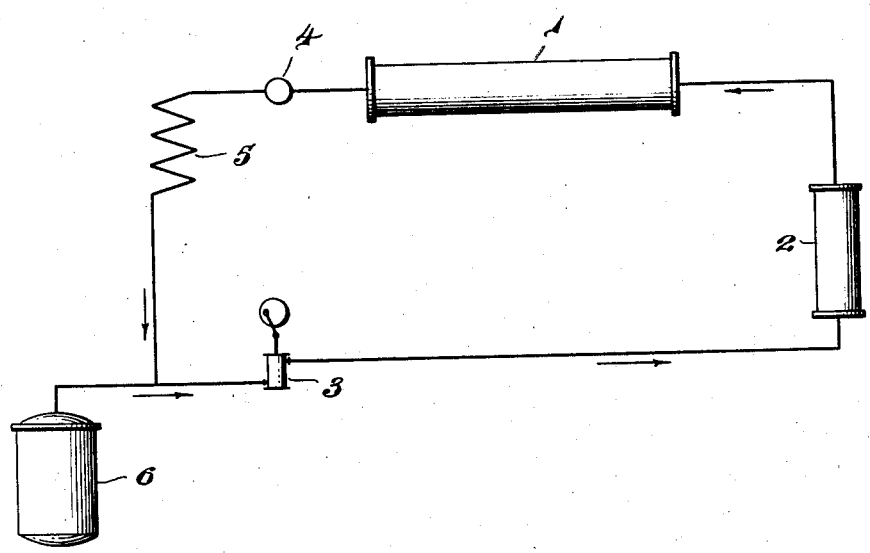
Inventors
Ernst Korten
Karl Keller
Attys Patented Mar. 4, 1941

2,233,817

UNITED STATES PATENT OFFICE 2,233,817

PROCESS FOR PRODUCING MELAMINE

Ernst Korten and Karl Keller, Frankfort-on-the-Main - Fechenheim, Germany, assignors, by mesne assignments, to General Aniline & Film Corporation, New York, N. Y., a corporation of Delaware Application January 30, 1939, Serial No. 253,590
In Germany January 29, 1938

1 Claim. (Cl. 260—248)

(Granted under the provisions of sec. 14, act of March 2, 1927; 357 O. G. 5)

Our present invention relates to an improved process for producing melamine.

According to the process as described in British Specification No. 466,957 melamine (symmetrical triamino-1,3,5-triazine) is obtained with an excellent yield when carrying out the well known action of ammonia on dicyandiamide with a far-reaching exclusion of water. When using therefor liquid ammonia this method involves some apparatus difficulties owing to the pressure thereby obtained which usually ranges between 100 and 200 atmospheres. These difficulties may be avoided by using a solution of ammonia in a suitable anhydrous solvent.

The present invention relates to an improvement of the said action of liquid ammonia on dicyandiamide, whereby the above mentioned difficulties pertaining to apparatus are avoidable and the reaction can be carried out while obtaining an essentially lower pressure. The present improvement of the said process consists in the special mode of action of producing the pressure of ammonia outside of the real reaction vessel. This special mode of action may be carried out for instance by annexing to the reaction vessel another receiver charged with liquid ammonia and heating therein the liquid ammonia to temperatures corresponding with the desired vapor tension. In this manner during the whole reaction time even when varying the temperature of the reaction mass a pressure is obtained which is entirely constant and essentially lower than the above mentioned pressure.

Such a mode of action may be advantageously used for the continuous manufactures of melamine from dicyandiamide by leading the dicyandiamide under the desired pressure by means of a conveyor belt or an endless screw conveyor through a heated tube and carrying out the introduction and the removal while maintaining the desired pressure in the apparatus.

According to a further form of executing the present improved process one may produce the pressure of ammonia which is necessary for the reaction vessel not by heating the receiver charged with ammonia but by means of a pump which is inserted between the receiver charged with ammonia and the reaction vessel. In this case it is sufficient if the receiver charged with ammonia is kept at room temperature. One may proceed for instance as follows: From a receiver, ammonia in the gaseous or liquid state is transported by means of a pump and in the latter case it is evaporated in a preheater before the entrance into the reaction vessel. In front of or behind the reaction vessel an automatic pressure valve is placed. By regulating this valve and the power of the pump, the desired pressure of ammonia is always maintained within the apparatus. The ammonia, which flows off through the pressure valve after the beginning of the strongly exothermic reaction and the increasing of the temperature of the reaction vessel involved thereby, is then passed through a cooling apparatus and finally introduced into the receiver which is to be charged with ammonia.

Likewise in this case the introduction of dicyandiamide into the reaction vessel may be carried out continuously or intermittently.

In consequence of the aforesaid strongly exothermic course of the reaction in many cases the reaction mass is so strongly heated that it sinters or even melts, a fact which may involve burdensome troubles particularly by sintering of the reaction mass on the screw when carrying out a continuous introduction of dicyandiamide. This disadvantage may be avoided in a simple maner by introducing into the apparatus not pure dicyandiamide but a mixture of dicyandiamide and melamine. By this dilution of the initial product by the end-product of the reaction one is enabled to avoid the aforesaid disadvantage without the addition of foreign substances which would have to be separated off by subsequent steps of working.

The melamine may be mixed with the initial product in the form as obtained by the reaction. The amount thereof may be regulated in each case according to the reaction conditions, such as the size of the apparatus, the rapidity of passage and the like, and may be tested in each case in order to find out the optimum.

According to each of the aforesaid modifications of the present improved process, melamine is obtained in an almost pure state with a nearly theoretical yield.

In order to further illustrate our invention the following examples are given the part being by weight and all temperatures in degrees centigrade.

*Example 1*

In a vessel which is resistant to pressure and has been charged with dry dicyandiamide at first the pressure is diminished until a vacuum of about 20 mms. is obtained. Then the vessel is heated and a receiver is annexed thereto which has been charged with liquid ammonia and heated to about 67° internal temperature.

When an equalization of pressure and temperature has occurred within the whole apparatus, a constant pressure of about 30 atmospheres is obtained which is independent from the temperature of the heated reaction vessel provided only that this temperature surpasses that of the receiver. When the temperature of the reaction vessel has surpassed about 100°, the exothermic reaction begins with a rapid raising of temperature and after a short time a likewise rapid decrease of temperature.

The reaction product consists of nearly pure melamine which has been obtained with an almost theoretical yield.

Example 2

From a receiver which is resistant to pressure and has been charged with powdered dry dicyandiamide by means of an endless screw dicyandiamide is introduced continuously into a reaction tube which is resistant to pressure and heated to the desired temperature. By means of a screw conveyor the reaction mass is slowly moved forward within the reaction tube, the conversion of the dicyandiamide into melamine occurring under an ammonia vapor tension of 25 to 40 atmospheres which is produced as described in Example 1.

The length of the reaction tube, the motive power of the screw conveyor and the temperature must be well balanced in such a manner that at the end of the tube the reaction is finished and pure melamine goes out. It then falls into a vessel which is resistant to pressure and when filled can be separated from the reaction tube by means of a stop apparatus in order to empty the vessel. In order to make the process continuous, it is advantageous to provide duplicate receivers from which the dicyandiamide is transported into the reaction tube and duplicate vessels for collecting the melamine produced. These are connected in parallel to the reaction tube so that one set can always be in operation.

When introducing into the reaction tube instead of dicyandiamide a mixture of 70 parts of dry dicyandiamide and 30 parts of dry melamine a sintering of the reaction is absolutely avoided. The melamine which goes out at the end of the tube is extremely pure and can be worked up without a further purification.

Example 3

A suitable apparatus for carrying out the reaction in accordance with the present invention is schematically illustrated in the accompanying drawing. Dry dicyandiamide is heated in a reaction vessel 1 which is resistant to pressure and is provided with a heating appliance. Gaseous or liquid ammonia is passed through a preheater or evaporator 2 and introduced into reaction vessel 1 under pressure by means of pump 3. Within the reaction vessel the pressure is maintained for instance at 25 to 40 atmospheres by means of an automatic pressure valve 4, which is placed in front of or behind the reaction vessel. The amount of ammonia which passes this valve may be controlled by a suitable regulation of the pump power. The ammonia is then transported to a pressure cooling apparatus 5 placed between receiver 6 and pump 3, whereby a circulation of the ammonia under a constant and convenient pressure is obtained, which is independent from the temperature of the reaction vessel and the exothermic reaction. Advantageously the temperature of the reaction vessel and evaporator is maintained constantly above the critical temperature of ammonia in order to avoid the formation of liquid ammonia.

Example 4

An autoclave of iron is charged until about the half of its volume with a mixture of 800 parts of powdered dry dicyandiamide and 160 parts of melamine as obtained by an antecedent process together with about 850 parts of anhydrous xylene. Then into the closed vessel while stirring 37–40 parts of liquid or gaseous ammonia is introduced and the mixture is slowly heated at about 135°. The temperature is maintained for some hours. The exothermic reaction is extended for a longer time under such conditions and may be easily controlled by regulating the heating. Then the reaction mass is stirred for some hours at 140 to 142°. The pressure is then 20 to 22 atmospheres.

When cool the mixture consists of a crystal pulp of melamine in xylene which can be easily stirred. Without such an addition of melamine to the initial dicyandiamide often the reaction-mass is sintering so that stirring is no more possible. The formed raw melamine has a purity degree of 95 to 98% and may be used for further reactions without any purification.

We claim:

In a process for producing melamine by reacting dicyandiamide with ammonia the improvement which comprises mixing the dicyandiamide with melamine before subjecting said dicyandiamide to the action of the ammonia.

ERNST KORTEN.
KARL KELLER.